Patented July 31, 1923.

1,463,209

UNITED STATES PATENT OFFICE.

JOHN E. HAGGENMACHER, OF CLEVELAND, OHIO, ASSIGNOR TO THE GRASSELLI CHEMICAL COMPANY, OF CLEVELAND, OHIO, A CORPORATION OF OHIO.

PROCESS FOR THE MANUFACTURE OF ACETIC ACID.

No Drawing.    Application filed December 16, 1922.   Serial No. 607,423.

*To all whom it may concern:*

Be it known that I, JOHN E. HAGGENMACHER, a citizen of Switzerland, residing at Cleveland, in the county of Cuyahoga and State of Ohio, have invented certain new and useful Improvements in Processes for the Manufacture of Acetic Acid, of which the following is a specification.

My invention relates to an improved process for the manufacture of acetic acid.

In an application for Letters Patent filed by Henry Howard, December 15, 1922, Serial No. 607,201, and entitled "Process for the manufacture of concentrated acetic acid," there is described a process of making acetic acid which consists essentially in distilling a reaction mixture formed of calcium acetate, hydrochloric acid and water, or a water solution of acetic acid, the mixture containing water in quantity sufficient to permit the complete liberation of acetic acid from the acetate. The distillation is carried out in at least two stages, the first stage producing a concentrated acetic acid product which is set aside as the final product, and the second stage producing a relatively dilute acetic acid solution which is employed as the solvent in the preparation of another batch of calcium acetate and hydrochloric acid for distillation.

Features of the invention described in said application are the cutting of the distillate into fractions of different concentration, the stronger fraction being the final product and the weaker fraction being returned to the process so that only strong acid is produced as a final product; and the obtaining of good yields concurrent with the production of a concentrated acetic acid product. A further feature of said invention resides in the use of indirect heating in the first part of the distillation for the production of the strong acetic acid fraction and the blowing of steam through the batch in conjunction with the indirect heating to complete the distillation. Since the use of direct steam results in the dilution of the distillate, a further feature of said invention resides in the limitation of the use of direct steam so that no more dilute acetic acid is produced than can be returned to the process. Still another feature of the process described in said application is the scrubbing of the acetic acid distillate with a solution of calcium acetate and acetic acid maintained at boiling temperature to remove hydrochloric acid from the distillate.

My invention relates primarily to a process of making acetic acid by vacuum distillation of a reaction mixture of calcium acetate and hydrochloric acid in aqueous solution. My invention relates further to the application of vacuum distillation to the process described in said application and to certain other improvements in the details of said process as will appear hereinafter.

It has been proposed heretofore to make acetic acid by vacuum distillation of a mixture of calcium acetate and sulfuric acid or their reaction products, but so far as I am aware no commercial method involving the vacuum distillation of a reaction mixture of calcium acetate and hydrochloric acid has been described or used prior to my invention.

When a solution containing the reaction products of calcium acetate and hydrochloric acid is distilled at atmospheric pressure, hydrochloric acid is distilled along with the acetic acid. Consequently the scrubbing of the distillate with a solution of calcium acetate and acetic acid as is proposed in the application referred to above is practically essential. I have found, however, that by distilling under reduced pressure the quantity of hydrochloric acid carried over with the acetic acid distillate is diminished. This is explained by the fact that acetic acid in the presence of water reacts slightly with calcium chlorid forming hydrochloric acid. The extent of this reaction increases with increase in temperature. Consequently the use of vacuum distillation and the resulting lower temperature of distillation reduce the concentration of hydrochloric acid in the reaction mixture and in the distillate, as a result of which less scrubbing is required and a more nearly pure product is obtainable.

As is explained in said application Serial No. 607,201 the use of a reaction mixture containing sufficient water to dissolve the calcium chlorid formed by the reaction or sufficient to permit the complete liberation of the acetate component of the calcium acetate as acetic acid is necessary to the production of good yields of acetic acid. This condition exists also when vacuum distillation is employed. I have found, however, that by means of vacuum distillation a more concentrated distillate or a greater quantity of distillate of a given concentration is obtainable than can be obtained by distillation at atmospheric pressure. Due to the fact that a greater proportion of the acetic acid content of a batch can be distilled in the form of concentrated acetic acid product, the distillation with direct steam may be extended, thus improving the yields.

I have further found it to be highly advantageous in the vacuum distillation of a mixture of calcium acetate and hydrochloric acid in water or acetic acid solution to employ some means to reduce the frothing or foaming of the mixture. In the absence of some such means the frothing of the charge presents a very serious, if not a practically prohibitive, obstacle in the way of successful operation with vacuum distillation.

While my invention is applicable to the straight distillation of a mixture of calcium acetate and hydrochloric acid in which all of the distillate is collected together, I prefer to apply the vacuum distillation to the process in which the distillate is collected in separate fractions, the stronger fraction being reserved as the final product and the weaker fraction being returned to the process.

I have made the further observation that the higher is the vacuum employed in the distillation the higher is the concentration of the acetic acid product.

Vacuum distillation may be applied with advantage to a reaction mixture containing chemically equivalent amounts of hydrochloric acid and calcium acetate, but I have discovered that improved results are obtained by using a small deficiency of hydrochloric acid, say from 90 to 95 per cent of the quantity necessary to completely decompose the calcium acetate, in the first stage of the distillation, and then adding the remainder of the hydrochloric acid necessary to decompose the calcium acetate during the completion of the distillation. This procedure reduces the quantity of hydrochloric acid distilled in the first stage of the distillation and in the same measure reduces the scrubbing requirements for the production of an acetic acid product free or substantially free of hydrochloric acid.

A preferred procedure in accordance with my invention is as follows:

Calcium acetate is dissolved in a hydrochloric acid solution of about 22° Bé. containing from 90 to 95 per cent of the quantity of hydrochloric acid necessary to completely decompose the calcium acetate. In place of a 22° Bé. hydrochloric acid solution a dilute solution of acetic acid containing the same quantities of water and hydrochloric acid as the 22° Bé. hydrochloric acid solution may be used. Or the calcium acetate may be dissolved in the dilute solution of acetic acid from a previous distillation and the necessary quantity of anhydrous hydrochloric acid absorbed in the solution. The mixture prepared as described is placed in a steam jacketed iron still and a quantity of wax or tallow or similar oily material, preferably paraffin wax, sufficient to form an unbroken film over the surface of the charge is added to the still. The still is connected with a scrubber vessel containing calcium acetate dissolved in an acetic acid solution of from 50 to 60 per cent strength or higher depending upon the concentration of the acetic acid product to be distilled, and a foam-preventing material such as paraffin wax. The still and the scrubber are then placed under reduced pressure, say a pressure of 120 mm. of mercury or less, the scrubber solution is heated to or near its boiling point, and the batch in the still is boiled by indirect heating through the steam jacket. The acetic acid distillate passing through the scrubber is condensed and set aside as the final product. The distillate becomes more and more dilute as the distillation proceeds, and at the desired point the distillate is cut, sufficient hydrochloric acid is added to the still to complete the decomposition of the calcium acetate content of the batch, the distillation is continued by indirect heating as far as possible and is then completed to the desired extent by blowing live steam through the charge. During this second stage of the distillation following the cut the distillate is passed directly to a condenser from which the dilute acetic acid solution to be returned to the process is collected. The dilute acetic acid solution produced in each distilling operation is used in preparing a subsequent batch to be distilled.

As is stated above, the pressure in the still should not exceed 120 mm. of mercury. The temperature to which the batch is heated should not exceed about 90° C., because at this temperature hydrochloric acid commences to distil in objectionable amounts.

By operating in the manner described 80 per cent or more of the acetic acid content of a batch may be distilled in the form of an acetic acid solution of from 50 to 60 per cent or even greater strength, and the yield of acetic acid calculated on the acetate content of the calcium acetate is 90 per cent or better. The acetic acid product is colorless and contains only traces of hydrochloric acid.

It is to be understood that the invention is not limited to the specific procedure described in the foregoing example. As has already been stated, the principal feature of the invention is the use of vacuum in distilling a reaction mixture of hydrochloric acid and calcium acetate. This process alone produces improved results. The calcium acetate and hydrochloric acid may be mixed in chemically equivalent proportions, and the distillation carried out without scrubbing the distillate or cutting the distillate into strong and weak fractions, or returning the weak fraction to the process. The cutting of the distillate into fractions, the use of a deficiency of hydrochloric acid during the first stage of the distillation, the return of dilute acetic acid distillate to the process, the scrubbing of the distillate, the use of a foam-preventing agent, and the use of indirect and direct heating as described are all features which contribute to but do not necessarily form a part of the process. It will also be apparent that the amount of water present in the reaction mixture may vary within reasonable limits. The preparation of a reaction mixture from commercial calcium acetate and a 22° Bé. hydrochloric acid solution is indicated as giving a satisfactory water content. If a more dilute mixture is used the yields of acetic acid may be improved at the expense of concentration, while if a more concentrated reaction mixture is used a higher concentration of acetic acid may be obtained at the expense of the yield and purity of the acetic acid product.

It will also be apparent that instead of supplying the hydrochloric acid to the reaction mixture in only two stages and distilling in only two stages, as is described above, the hydrochloric acid may be added in a greater number of stages in equal or unequal fractions of the quantity required for complete reaction, and the distillate may be cut into any desired number of fractions.

I claim:

1. Process of making acetic acid which comprises mixing hydrochloric acid and calcium acetate in the presence of sufficient water to permit the substantially complete liberation of the acetate content of the calcium acetate in the form of acetic acid, and distilling the mixture under reduced pressure.

2. Process of making acetic acid which comprises mixing hydrochloric acid and calcium acetate in water in quantity sufficient to dissolve the same and their reaction products, and distilling the mixture under reduced pressure.

3. Process of making acetic acid which comprises mixing hydrochloric acid, calcium acetate, acetic acid, and water, said water in quantity sufficient to dissolve the hydrochloric acid, calcium acetate and acetic acid and their reaction products, and distilling the mixture under reduced pressure.

4. Process of making acetic acid which comprises mixing calcium acetate and water with hydrochloric acid in quantity insufficient to liberate the whole acetate component of said calcium acetate in the form of acetic acid, distilling the reaction mixture under reduced pressure, collecting the distillate, adding a further quantity of hydrochloric acid to the reaction mixture, distilling the resulting mixture, and separately collecting the resulting distillate.

5. Process of making acetic acid which comprises successively adding a plurality of portions of a solution of hydrochloric acid in water to a batch of calcium acetate, said portions together being sufficient to liberate the whole acetate component of said calcium acetate in the form of acetic acid, distilling the reaction mixture resulting from the addition of each portion of hydrochloric acid under reduced pressure, and separately collecting the distillate produced following the addition of each portion of hydrochloric acid.

6. Process of making acetic acid which comprises mixing calcium acetate with an aqueous solution of hydrochloric acid in quantity amounting to about 90 to 95 per cent of the quantity chemically equivalent to said calcium acetate, distilling the mixture under reduced pressure, collecting the distillate, adding hydrochloric acid in quantity sufficient to complete the liberation of acetic acid from said calcium acetate, distilling the resulting mixture, and separately collecting the distillate.

7. Process of making acetic acid which comprises mixing calcium acetate, hydrochloric acid, water, and a foam-preventing agent, and distilling the mixture under reduced pressure.

8. Process of making acetic acid which comprises mixing calcium acetate, hydrochloric acid, water and paraffin wax, and distilling the mixture under reduced pressure.

9. Process of making acetic acid which comprises mixing calcium acetate and hydrochloric acid, distilling the mixture under reduced pressure, and scrubbing the distillate with a solution containing calcium acetate held at substantially its boiling temperature and under reduced pressure.

10. Process of making acetic acid which comprises forming a liquid reaction mixture containing acetic acid, calcium chlorid, and water, covering said mixture with an oily foam-preventing substance, distilling the mixture under reduced pressure, and passing the distillate under reduced pressure through a body of liquid containing acetic acid and calcium acetate, said body of liquid being at substantially its boiling temperature and covered by an oily foam-preventing substance.

11. Process of making acetic acid which comprises mixing hydrochloric acid and calcium acetate and water, distilling the mixture under reduced pressure, and scrubbing the distillate with a liquid containing calcium acetate and acetic acid in about the same concentration of acetic acid in said distillate.

12. Process of making acetic acid which comprises mixing calcium acetate, hydrochloric acid, acetic acid and water, distilling the mixture under reduced pressure solely by indirect heating, collecting the distillate, distilling the residue of said mixture by indirect heating and by blowing live steam through the mixture, and separately collecting the resulting distillate.

13. Process of making acetic acid which comprises successively distilling batches formed by mixing calcium acetate, hydrochloric acid and a solution of acetic acid under reduced pressure, cutting the distillate into a first concentrated acetic acid fraction and a later dilute acetic acid fraction, and using the said dilute acetic acid fraction from the distillation of each batch in the preparation of each next succeeding batch.

In testimony whereof, I affix my signature.

JOHN E. HAGGENMACHER.